United States Patent [19]

Koshiga et al.

[11] 4,110,589
[45] Aug. 29, 1978

[54] METHOD FOR LONGITUDINALLY SEAM-WELDING PIPE-BLANK FOR WELDED STEEL PIPE FROM THE INSIDE ALONG A GROOVE

[75] Inventors: Fusao Koshiga, Kawasaki; Jinkichi Tanaka, Yokohama; Itaru Watanabe, Yokohama; Motoaki Suzuki, Yokohama; Toshifumi Kojima, Yokohama; Hiroyoshi Matsubara, Fukuyama; Tatsumi Osuka, Fukuyama; Kenji Takeshige, Fukuyama; Takashi Nagamine, Fukuyama; Osamu Hirano, Fukuyama, all of Japan

[73] Assignee: Nippon Kokan Kabushiki Kaisha, Tokyo, Japan

[21] Appl. No.: 771,841

[22] Filed: Feb. 24, 1977

[30] Foreign Application Priority Data

Mar. 24, 1976 [JP] Japan .................................. 51-31392

[51] Int. Cl.² .............................................. B23K 9/08
[52] U.S. Cl. ........................................ 219/66; 219/123
[58] Field of Search ............... 219/60 R, 61, 66, 122, 219/123, 135, 137 R; 174/15 WF

[56] References Cited

U.S. PATENT DOCUMENTS

| | | | |
|---|---|---|---|
| 1,826,355 | 10/1931 | Lincoln | 219/122 |
| 2,702,846 | 2/1955 | Breymeier | 219/123 X |
| 2,745,934 | 5/1956 | Curtin et al. | 219/123 |

OTHER PUBLICATIONS

Jennings "Magnetic Arc Blow" in the Welding Journal 10/41, p. 427s.
Holt "Methods of Controlling Arc Blow" in Welding Engineer 3/32.

Primary Examiner—E. A. Goldberg
Attorney, Agent, or Firm—Flynn & Frishauf

[57] ABSTRACT

In longitudinally seam-welding a pipe-blank for welded steel pipe from the inside along a groove by the reverse-polarity GMA welding process comprising using direct electric current supplied to a consumable electrode through a cable as the welding current with said consumable electrode as the anode, the direction of said direct electric current for welding flowing through said cable introduced into said pipe-blank is set in the same direction as that of welding, thereby preventing occurrence of a magnetic arc blow of the welding arc from said consumable electrode toward the upstream side of the welding direction, i.e., in the opposite direction to that of welding.

3 Claims, 10 Drawing Figures

METHOD FOR LONGITUDINALLY SEAM-WELDING PIPE-BLANK FOR WELDED STEEL PIPE FROM THE INSIDE ALONG A GROOVE

FIELD OF THE INVENTION

The present invention relates to an improvement in the method for longitudinally seam-welding a pipe-blank for welded steel pipe from the inside along a groove by the reverse-polarity GMA welding process comprising using direct electric current as the welding current with a consumable electrode as the anode, said improvement giving a beautiful and sound weld free from welding defects.

BACKGROUND OF THE INVENTION

Conventionally, in longitudinally seam-welding, for manufacturing a welded steel pipe, the groove or cleft of an O-shaped plate (hereinafter called "pipe-blank"), formed into a cylindrical shape by a forming process such as the U-O process (abbreviation of the U-ing/O-ing process) and the bending roll process, as shown in the schematic side view given in FIG. 1 for example, it is the usual practice of welding to employ an inside welding machine equipped with a welding torch 1 attached to the free end of a boom 2 having a length at least equal to that of a pipe-blank 3 to be welded, the fixed end of said boom 2 being fixed to a carriage 4; to insert said boom 2 into said pipe-blank 3 in advance; and, to longitudinally seam-weld said pipe-blank 3 from the inside along the groove or cleft with a consumable electrode 5 fed through said welding torch 1, while moving said boom 2 by said carriage 4, together with a cable 9 serving to supply welding current to said consumable electrode 5, in the withdrawal direction from said pipe-blank 3, i.e., in the welding direction as indicated by an arrow in the drawing. A prior art inside welding machine equipped with two welding torches 1 and 1, leading and trailing, and two consumable electrodes 5 and 5 is represented in FIG. 1. However, an inside welding machine may have one welding torch and one consumable electrode, or it may be provided with more than two welding torches and more than two consumable electrodes.

In the aforementioned conventional welding method of a pipe-blank, when adopting a welding process comprising using direct electric current as the welding current with a consumable electrode as the anode, such as the reverse-polarity GMA welding process (GMA welding process is the abbreviation of the gas metal arc welding process which comprises carrying out welding while shielding a molten metal and a welding arc produced in the space between the base metal and the consumable electrode from open air with shielding gases such as an inert gas and a carbon dioxide gas), as shown in the partially enlarged schematic drawing given in FIG. 2, the welding arc 6 from the consumable electrode 5 is deflected toward the upstream side of the welding direction indicated by an arrow in the drawing, i.e., in the opposite direction to that of welding, and takes the form as if it is drawn in by the molten metal 7. When the welding arc 6 takes the form as if it is drawn in by the molten metal 7 as mentioned above, the plasma jet stream produced at the tip of the consumable electrode 5 is also deflected toward the molten metal 7 and acts on said molten metal 7 as a dynamic pressure. This pushes said molten metal 7 away toward the upstream side of the welding direction, i.e., in the opposite direction to that of welding. As a result, the space below the consumable electrode 5 becomes substantially dry without molten metal, thus impairing the affinity between molten droplets from the consumable electrode 5 and the base metal, at the groove of the pipe-blank 3. Welding defects such as undercut of bead, humping bead and lack of fusion of base metal tend thus easily to occur. In addition, frequent occurrence of boiling and spattering in the molten metal 7 tends to result in a deteriorated appearance of the weld bead. When the welding arc 6 is deflected as described above, furthermore, the tip of the consumable electrode 5 is melted only on one side as shown in FIG. 2. Under such circumstances, the transfer mode of molten droplets from the consumable electrode 5 cannot be a desirable spray transfer, but takes an undesirable mixed form of globular transfer and short-circuit transfer. As a result, coarse spatters and splashed with a crackling short-circuiting noise and are deposited on the weld bead surface, thus leading to a deteriorated appearance of the weld bead. What is worse, splashed spatters are deposited on the opening at the tip of the shielding nozzle (not shown) of the welding torch to disturb the gas shield and entangle the air. In this state, it may practically be impossible to carry out welding.

The above-mentioned deflection of the welding arc toward the upstream side of the welding direction, i.e., in the opposite direction to that of welding and the resulting irregular weld bead and welding defects are not limited only in the case of the conventional GMA welding process, but occur also in the case of the submerged-arc welding process using direct electric current as the welding current. In both cases, it has been difficult to obtain a beautiful and sound weld free from welding defects.

SUMMARY OF THE INVENTION

An object of the present invention is therefore to provide an improvement in the longitudinal seam-welding of a pipe-blank for welded steel pipe from the inside along a groove by the reverse GMA welding process which comprises using direct electric current as the welding current with a consumable electrode as the anode, said improvement being capable of giving a beautiful and sound weld free from welding defects.

Another object of the present invention is to prevent occurrence of a magnetic arc the welding arc toward the upstream side of the welding direction, i.e., in the opposite direction to that of welding, in longitudinally seam-welding a pipe-blank for welded steel pipe from the inside along a groove by said GMA welding process.

A further object of the present invention is to intentionally cause the occurrence of a magnetic arc blow of the welding arc toward the downstream side of the welding direction, i.e., in the same direction as that of welding, in longitudinally seam-welding a pipe-blank for welded steel pipe from the inside along a groove by said GMA welding process.

In accordance with one of the features of the present invention, there is provided an improvement in the welding method which comprises applying the reverse-polarity GMA welding process comprising using direct electric current supplied to a consumable electrode through a cable as the welding current with said consumable electrode as the anode, and longitudinally seam-welding a pipe-blank for welded steel pipe from the inside along a groove with said consumable electrode fed through a welding torch, while moving a boom through said pipe-blank relative thereto in the same direction as that of welding, said boom being equipped with said welding torch at the free end thereof and having a length at least equal to that of said pipe-blank, said improvement comprising the steps of:

setting the direction of said direct electric current for welding flowing through said cable introduced into said pipe-blank in the same direction as that of welding, thereby preventing occurrence of a magnetic arc blow of the welding arc from said consumable electrode toward the upstream side of the welding direction, i.e., in the opposite direction to that of welding.

DETAILED DESCRIPTION OF PREFERRED EMBODIMENTS

With a view to making basic considerations on the irregular weld bead and welding defects such as undercut of bead, humping bead, lack of fusion of base metal and spattering, observed in longitudinally seam-welding a pipe-blank for welded steel pipe from the inside along a groove by the conventional welding process as mentioned above, and for clarifying causes thereof, the inventors have made intensive studies. As a result, it has been found that the occurrence of said irregular weld bead and said welding defects is attributable to the deflection of a plasma jet stream toward a molten metal caused by the deflection of a welding arc, and also that said deflection of the welding arc is brought about by a line of magnetic force produced by the direct electric current for welding flowing through a cable introduced into the pipe-blank.

Figure 3:
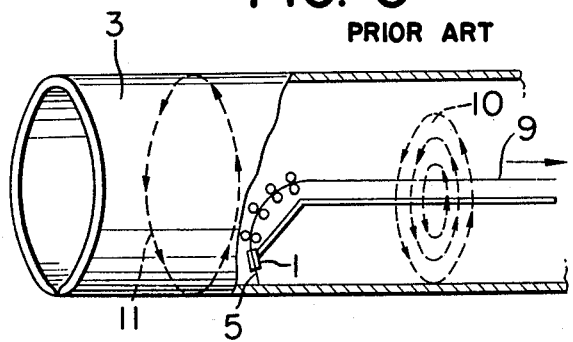
FIG. 3 is a partial cutaway schematic side view illustrating a form of welding in longitudinally seam-welding a pipe-blank for welded steel pipe from inside along a groove by said conventional reverse-polarity GMA welding process.

More specifically, for instance, in longitudinally seam-welding a pipe-blank for welded steel pipe from the inside along a groove by the conventional reverse-polarity GMA welding process comprising using direct electric current as the welding current with a consumable electrode as the anode, direct electric current for welding flows, as shown in the partial cutaway schematic side view given in FIG. 3, in the opposite direction to that of welding indicated by an arrow in the drawing, through a cable 9 introduced into the pipe-blank 3. Therefore, a line of magnetic force 10, which is clockwise as viewed from the right-hand side of the drawing, is produced by said direct electric current, and a strong magnetic field is formed around said cable 9. As a result, said pipe-blank 3 is strongly magnetized in the same clockwise direction 11 as that of the line of magnetic force 10 by said magnetic field, thus causing leakage of a strong line of magnetic force from the groove of said pipe-blank 3, and a strong magnetic field is formed at said groove. When welding a groove where such a strong magnetic field is formed, the welding arc from a consumable electrode 5, which is a flow of charged corpuscle, is deflected by said strong magnetic field at the groove. This phenomenon is called the magnetic arc blow of the welding arc.

Figure 2:
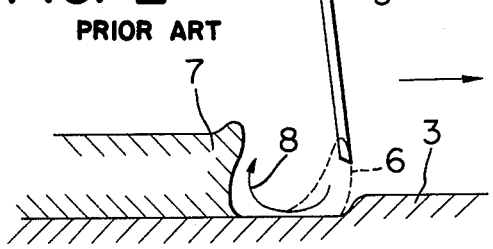
FIG. 2 is a partially enlarged schematic drawing illustrating a form of welding in the conventional reverse-polarity GMA welding process comprising using direct electric current as the welding current with a consumable electrode as the anode.
Figure 4A:
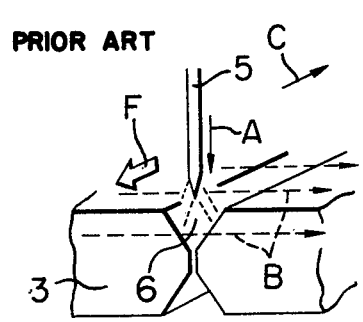
FIGS. 4(a) and 4(b) are vector diagrams illustrating the relation between the direction of the electric current flowing through a welding arc, magnetizing direction at the groove of a pipe-blank for welded steel pipe, and the direction of the force acting on said welding arc at said groove in said conventional reverse-polarity GMA welding process.
Figure 4B:
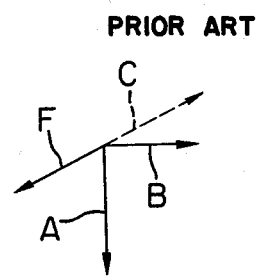

The relation between the direction of the electric current flowing through a welding arc, magnetizing direction at the groove of a pipe-blank and the direction of the force acting on said welding arc at said groove is illustrated in the vector diagrams of FIGS. 4(a) and 4(b). In these drawings, A is the direction of the electric current flowing in the welding arc 6 through the consumable electrode 5; B is the magnetizing direction at the groove of the pipe-blank 3; C is is the welding direction; and F is the direction of the force acting on said welding arc 6. As shown in FIGS. 4(a) and 4(b), the direction F of the force acting on the welding arc 6 is the same as that of the direct electric current for welding flowing through the cable 9 (refer to FIG. 3) and is opposite to the welding direction C. As described above with reference to FIG. 2, therefore, the welding arc 6 is deflected toward the upstream side of the welding direction C, i.e., in the opposite direction to that of welding C, thus resulting in such irregular weld bead and welding defects as undercut of bead, humping bead, lack of fusion of base metal and spattering.

The present invention, which has been made based on the aforementioned finding, permits prevention of the above-mentioned magnetic arc blow of the welding arc toward the upstream side of the welding direction, i.e., in the opposite direction to that of welding, and gives a beautiful and sound weld free from welding defects, by setting the direction of the direct electric current for welding flowing through the cable introduced into the pipe-blank for welded steel pipe in the same direction as that of welding, in longitudinally seam-welding said pipe-blank from the inside along a groove by the conventional reverse-polarity GMA welding process which comprises using direct electric current supplied through the cable to the consumable electrode as the welding current with said consumable electrode as the anode.

Figure 5:
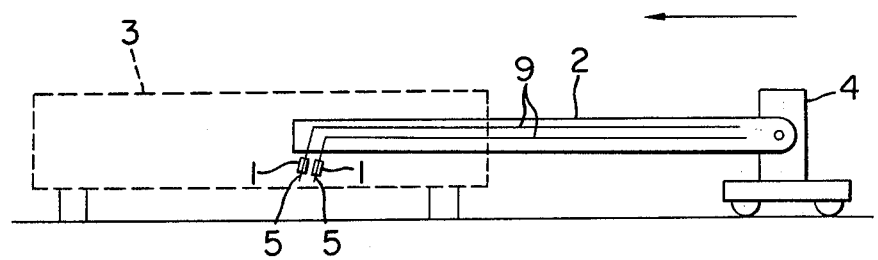
FIG. 5 is a schematic side view illustrating an embodiment of the method of the present invention.
Figure 6:
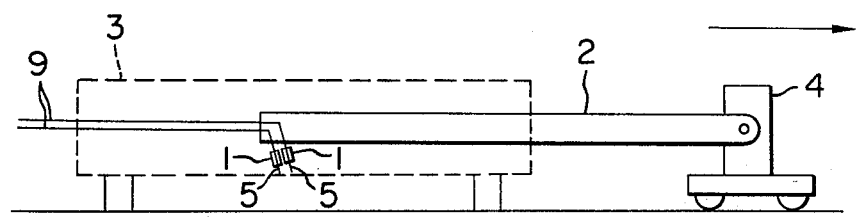
FIG. 6 is a schematic side view illustrating another embodiment of the method of the present invention.

More specifically, in the method of the present invention, the conventional reverse-polarity GMA welding process is applied, which comprises using direct electric current as the welding current with a consumable electrode as the anode. And, as shown in the schematic side view of FIG. 5, a pipe-blank 3 is longitudinally seam-welded from the inside along a groove in the welding direction as indicated by an arrow in the drawing, with a consumable electrode 5 fed through a welding torch 1 while inserting into said pipe-blank a boom 2, having a length at least equal to that of said pipe-blank 3, mounted on a carriage 4 at the fixed end thereof and equipped with said welding torch 1 at the free end thereof, together with a cable 9 for supplying direct electric current for welding to said consumable electrode 5, by said carriage 4. Alternatively as shown in the schematic side view of FIG. 6, the boom 2 is inserted in advance into the pipe-blank 3 by the carriage 4, and the cable 9 is introduced into said pipe-blank 3 from the position opposite to that of said carriage 4, and then, said pipe-blank 3 is longitudinally seam-welded from the inside along the groove in the welding direction as indicated by an arrow in the drawing with the consumable electrode 5, while withdrawing said boom 2 from said pipe-blank 3 by said carriage 4.

In the aforementioned methods of the present invention, the direction of the direct electric current or welding flowing through the cable 9 introduced into the pipe-blank is always identical with that of welding. This totally eliminates the risk of magnetic arc blow of the welding arc toward the upstream side of the welding direction, i.e., in the opposite direction to that of welding, and the resulting irregular weld bead and welding defects.

Figure 7:
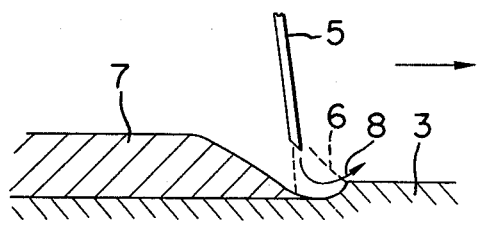
FIG. 7 is a partially enlarged schematic drawing illustrating a form of welding in the method of the present invention.

In any of the aforementioned methods of the present invention, there occurs a magnetic arc blow toward the downstream side of the welding direction, i.e., in the same direction as that of welding. However, unlike the magnetic arc blow in the opposite direction to that of welding, this magnetic arc blow in the same direction as that of welding does not exert an adverse effect on the formation of welding beads, but brings about satisfactory results. More specifically, as shown in the partially enlarged schematic drawing of FIG. 7, in the method of the present invention, the welding arc 6 from the consumable electrode 5 takes the form deflected toward the downstream side of the welding direction, i.e., in the same direction as that of welding, and consequently, the plasma jet stream produced at the tip of the consumable electrode 5 is also deflected toward the downstream side of the welding direction, i.e., in the same direction as that of welding. This gives a reasonable preheating effect on the part to be welded. Furthermore, since the molten metal 7 formed on the upstream side of the welding direction is never disturbed by the plasma jet stream, it is possible to conduct stable welding operations, and hence to raise the welding speed.

Now, the method of the present invention is described more in detail by way of an example:

EXAMPLE

Figure 1:
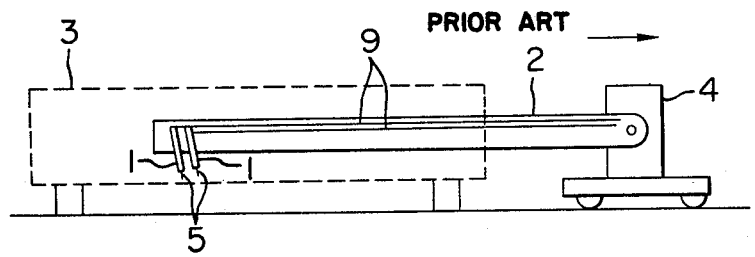
FIG. 1 is a schematic side view illustrating a conventional method for longitudinally seam-welding a pipe-blank for welded steel pipe from the inside along a groove and an apparatus for the implementation thereof.

In longitudinally seam-welding three pipe-blanks for welded steel pipe, from the inside along a groove, having a wall thickness of 1 inch, an outside diameter of 48 inches and a length of 12 meters by the conventional reverse-polarity GMA welding process which comprises using direct electric current as the welding current with a consumable electrode as the anode, the method of the present invention described above with reference to FIG. 5 was applied to the first pipe-blank, said method comprising longitudinally seam-welding a pipe-blank 3 from the inside along a groove with a consumable electrode 5 while inserting into said pipe-blank 3 a boom 2 equipped with a welding torch 1, through which said consumable electrode 5 is fed, at the free end of the boom, together with a cable 9, by a carriage 4. The other method of the present invention described above with reference to FIG. 6 was applied to the second pipe-blank, said method comprising inserting in advance into a pipe-blank 3 a boom 2 equipped with a welding torch 1, through which a consumable electrode 5 is fed, at the free end of the boom, introducing a cable 9 into said pipe-blank 3 from the opposite position to that of a carriage 4, and then, longitudinally seam-welding said pipe-blank 3 from the inside along the groove with said consumable electrode 5 while withdrawing said boom 2 from said pipe-blank 3 by said carriage 4. The conventional welding method outside the scope of the present invention, described above with reference to FIG. 1 for comparison purpose, was applied to the third pipe-blank, said method comprising inserting in advance into a pipe-blank 3 a boom 2 equipped with a welding torch 1, through which a consumable electrode 5 is fed, at the free end of the boom, together with a cable 9, and then longitudinally seam-welding said pipe-blank 3 from the inside along the groove with said consumable electrode 5 while withdrawing said boom 2, together with said cable 9, from said pipe-blank 3 by said carriage 4.

Figure 8:
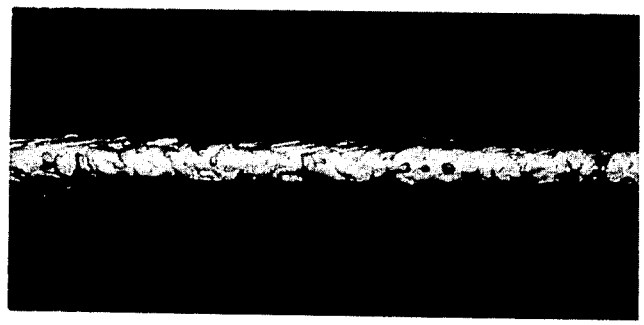
FIG. 8 is a photograph showing the state of a weld bead obtained by said conventional reverse-polarity GMA welding process.
Figure 9:
FIG. 9 is a photograph showing the state of a weld bead obtained by the method of the present invention.

The state of the weld beads obtained as a result is shown in FIGS. 8 and 9.

In the weld bead obtained by the conventional welding method, as shown in FIG. 8, not only is there serious spattering with a poor appearance, such welding defects as undercut of bead, humping bead and lack of fusion of base metal are observed. A sound weld could not be obtained.

The weld bead obtained by the welding method of the present invention, in contrast, has a beautiful appearance as shown in the photograph of FIG. 9 with no trace of welding defects.

The above description of the method of the present invention has covered only the case where a pipe-blank is fixed while moving only a boom equipped with a welding torch. The essential requirement in the present invention is however, in that the welding torch moves in the welding direction. Therefore, the method of the present invention covers also cases in which the pipe-blank is moved while fixing the boom equipped with a welding torch. In other words, in the method of the present invention, it suffices to relatively move a boom equipped with a welding torch through said pipe-blank in the welding direction.

According to the method of the present invention, as described above in detail, in longitudinally seam-welding a pipe-blank for welded steel pipe from the inside along a groove by the conventional reverse-polarity GMA welding process which comprises using direct electric current as the welding current with a consumable electrode as the anode, it is possible to prevent occurrence of an undesirable magnetic arc blow of the welding arc from the consumable electrode toward the upstream side of the welding direction, i.e., in the opposite direction to that of welding, attributable to the magnetization of said pipe-blank caused by said direct electric current flowing through a cable introduced into said pipe-blank. In addition, a desirable magnetic arc blow is produced toward the downstream side of the welding direction, i.e., in the same direction as that of welding, and a beautiful and sound weld free from irregular weld bead and welding defects can be obtained, thus providing industrially useful effects.

What is claimed is:

1. In a method for longitudinally seam welding a pipe-blank from the inside thereof using the reverse-polarity GMA welding process comprising: supplying direct electric current to a consumable welding electrode through a cable as the welding current, with said consumable electrode being maintained positive in polarity; and longitudinally seam-welding a pipe-blank for welded steel pipe from the inside along a cleft or groove by feeding said consumable electrode through a welding torch while moving a boom carrying said welding torch through said pipe-blank relative to said pipe-blank in the same direction as that of welding, said boom having a free end which carries said welding torch and having a length at least equal to that of said pipe-blank;

the improvement comprising the steps of:

arranging said cable in said pipe-blank in a predetermined direction; and supplying said direct electric welding current in such a direction that the welding current flowing through said cable flows in the same direction as the direction of welding, thereby preventing occurrence of a magnetic arc blow of the welding arc from said consumable electrode toward the upstream side of the welding direction, i.e., in the opposite direction to that of welding.

2. The method as claimed in claim 1, comprising the steps of longitudinally seam-welding said pipe-blank while successively inserting said boom into said pipe-blank relative to said pipe-blank, together with said cable, in the same direction as that of welding.

3. The method as claimed in claim 1, comprising the steps of inserting said boom in advance into said pipe-blank from an end of said pipe-blank; introducing said cable into said pipe-blank from the other end of said pipe-blank; and longitudinally seam-welding said pipe-blank while successively withdrawing said boom from said pipe-blank relative to said pipe-blank in the same direction as that of welding.

* * * * *